United States Patent [19]
Kaufman

[11] 3,861,741
[45] Jan. 21, 1975

[54] AUXILIARY BACKREST

[76] Inventor: Robert M. Kaufman, 7910 20th. Ave., Jenison, Mich. 49428

[22] Filed: Sept. 28, 1973

[21] Appl. No.: 401,842

[52] U.S. Cl. ................. 297/214, 297/397, 297/460
[51] Int. Cl. ........................ A47c 7/021, A47c 7/14
[58] Field of Search .......... 297/195, 214, 397, 410, 297/452, 459, DIG. 1, DIG. 2, DIG. 9, 460

[56] References Cited
UNITED STATES PATENTS

| | | | |
|---|---|---|---|
| 2,331,213 | 10/1943 | Mesinger | 297/DIG. 9 |
| 2,642,927 | 6/1953 | Rising | 297/410 |
| 2,897,878 | 8/1959 | Mungovan | 297/410 |
| 3,083,056 | 3/1963 | Ward | 297/452 |
| 3,253,859 | 5/1966 | Merriman et al. | 297/397 |
| 3,768,864 | 10/1973 | Niewulis | 297/DIG. 1 |

Primary Examiner—Casmir A. Nunberg
Attorney, Agent, or Firm—Price, Heneveld, Huizenga & Cooper

[57] ABSTRACT

A back support accessory for motorcycle seats having a primary passenger supporting plate and a pair of resilient brackets for detachably mounting it upon a contoured tubular seat frame in such a manner that the attachment can be easily made and readily concealed within the existing upholstery of the seat. The backrest is designed for use with seats having an upwardly curved rear portion wherein the backrest forms a cooperating continuity of the rear upper surface of the seat.

3 Claims, 5 Drawing Figures

PATENTED JAN 21 1975 3,861,741
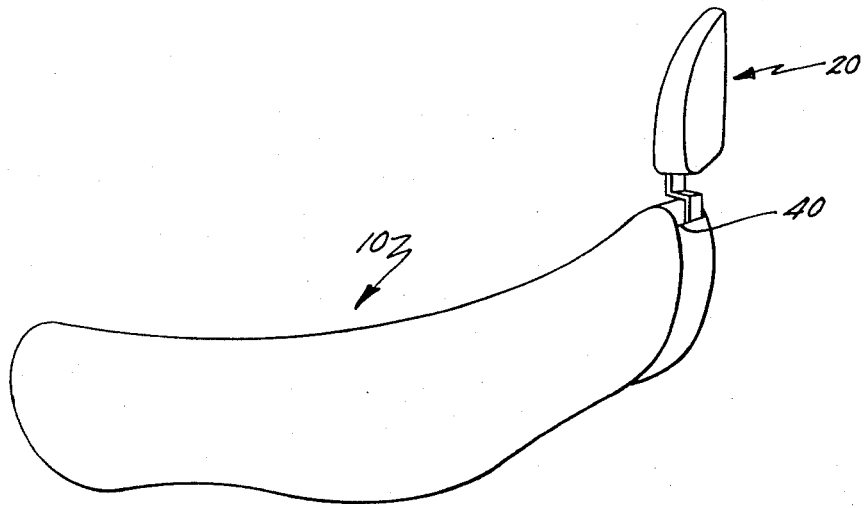
FIG. 1.
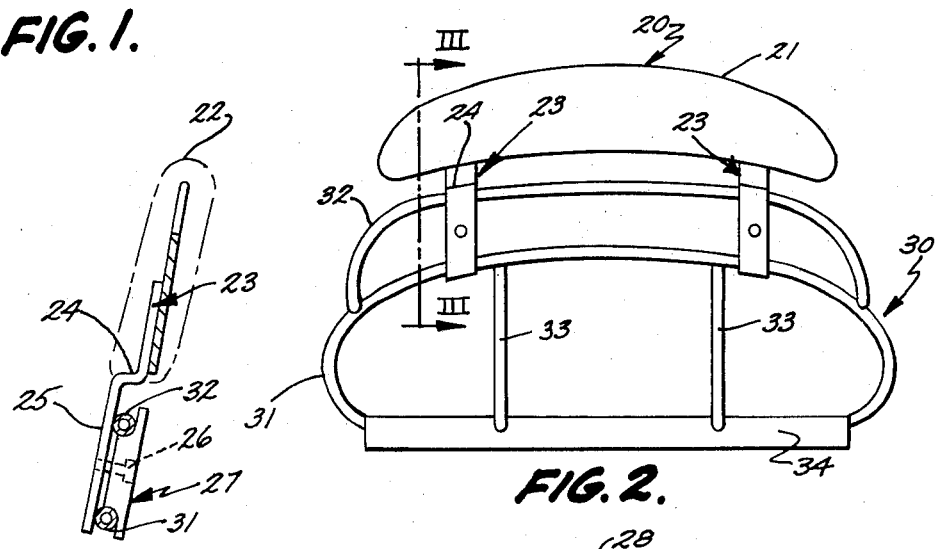
FIG. 3.
FIG. 2.
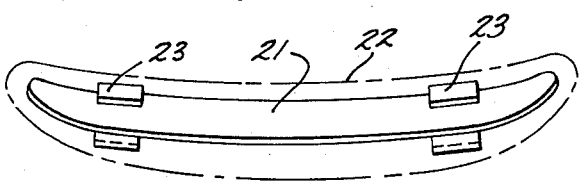
FIG. 6.
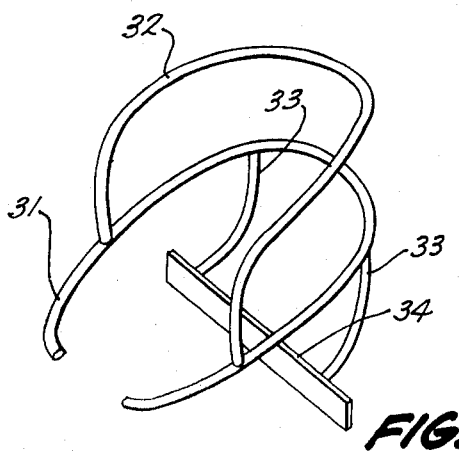
FIG. 5.
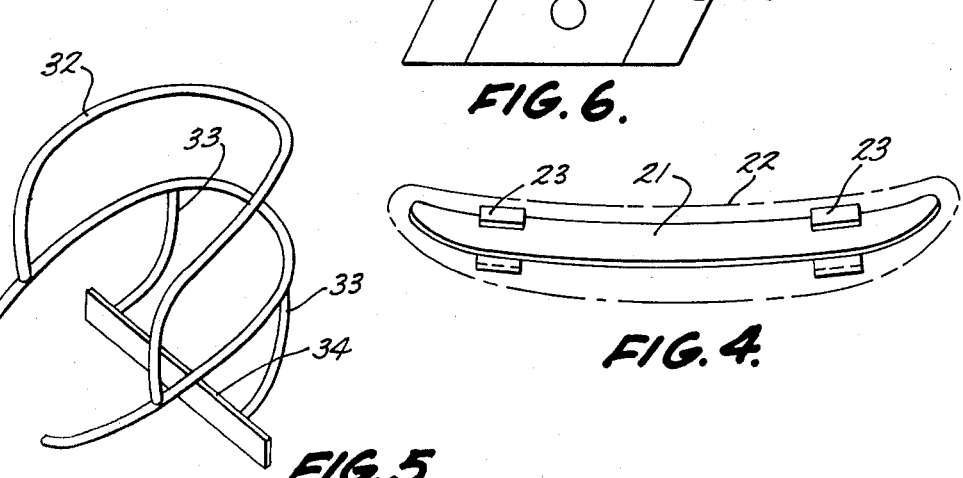
FIG. 4.

3,861,741

AUXILIARY BACKREST

BACKGROUND OF THE INVENTION

This invention relates to an accessory for motorcycle seating and particularly to a backrest designed for use with the dual rider-type of seat used on the larger high powered motorcycles such as the larger models of the Harley-Davidson. While backrest devices for motorcycles are well-known, none has been developed for the larger more powerful machines which will provide the type of support necessary under their particular operating conditions. Because of the nature of the seating provided on this type of machine, it is necessary to provide a broad and firm support for the passenger's back. It is also necessary to provide some means which is not only secure and positive but also reasonably easy to secure to the existing seat structure.

This invention provides a plate to form a strong, wide, contoured and positive support for the passenger. It also provides a resilient support for this plate which may be readily attached to the existing tubular framework used on this type of seat. Further, the means of attachment is such that the backrest of this invention may be secured to the seat without any basic modification of the upholstery of the existing seat and, thus, without impairing either the ornamental appearance of the seat or the resistance to weather and other elemental exposure which the seat was originally designed to withstand. The invention provides a clamping means specifically designed to accommodate the tubular frame structure of seats of this type and which may be attached without the use of special tools or skills. It may also be readily removed, should this be desired, without the necessity of having to restore the seat's upholstery to its original condition.

These and other objects and advantages of this invention will be readily understood by those acquainted with the design of motorcycle seating and the problems attendant thereto upon reading the following specification and the accompanying drawings.

BRIEF DESCRIPTION OF THE DRAWINGS

FIG. 1 is a side elevation view of a motorcycle seat to which this invention has been attached;

FIG. 2 is a rear elevation view of the internal structure of this invention mounted on the tubular framework of the existing motorcycle seat;

FIG. 3 is a sectional elevation view taken along the plane III—III of FIG. 2;

FIG. 4 is a plan view of the backrest indicating, in phantom, the padding and upholstery therefor;

FIG. 5 is a fragmentary, oblique view of the rear portion of the frame of the motorcycle seat with the upholstery padding and related seating materials removed; and FIG. 6 is a front view of one of the anchor plates used for mounting the backrest.

DESCRIPTION OF THE PREFERRED EMBODIMENT

Referring to the drawings and particularly to FIG. 1, the numeral 10 indicates a motorcycle seat of the type used on the larger models of the Harley-Davidson machines and adapted for supporting two people. The seat 10 is illustrated in upholstered condition with the entire framework of the seat concealed. The backrest 20 of this invention is mounted on the rear of the seat.

Referring now to FIG. 2, it will be seen that the rear portion of the seat is supported and shaped by a tubular frame 30. The portion of the frame forming the back face of the seat has a lower tubular frame member 31 and an upper tubular frame member 32. The lower tubular frame member 31 is curved to contour the back of the seat and its ends are tied into the remaining frame structure of the seat. The remaining frame structure of the seat is not illustrated because it is irrelevant to this invention. The lower frame member 31, intermediate its ends is supported by a pair of rearwardly arched braces 33. The upper ends of the braces 33 are securely welded to the lower frame member 31. The lower ends are secured to any suitable support such as the cross bar 34. It should be understood that the particular structure to which the lower ends of the braces 33 are welded is irrelevant to this invention and, therefore, various other structures besides the specific cross bar illustrated could be substituted. The upper frame member 32 is shorter than the lower frame member 31 and its ends are welded to the lower frame member as shown in FIGS. 2 and 5. It will be observed that this type of frame structure provides a strong yet resilient frame for the seat.

The backrest 20 has a wide, curved plate 21 forming the primary structural support for the padding and upholstery which contacts the body of a passenger riding on the seat 10. Preferably, the primary plate 21 is so contoured as to form a convex curvature from end to end, this curvature providing a concave face toward the passenger. The ends of the primary plate 21 are rounded to provide a smooth contour which will, under no circumstances, be a possible source of injury to anyone. In actual use, this plate is embedded within suitable upholstery 22 (indicated in phantom in FIGS. 3 and 4) which includes such padding material as foam and one or more outer coverings of a weather proof material such as a vinyl. Details of the upholstery are not shown because the manner of upholstery of this invention is conventional.

The seats on the particular type of machine for which this invention is intended are wide to provide the passenger adequate support. The width of the backrest is substantially the same as the seat. Thus, it provides a broad area of body contact affording full support to the passenger.

Projecting downwardly from the primary plate 21 are a pair of supports 23. These supports are spaced apart and their upper ends are welded to the front face of the primary plate 21 to provide a shock and vibration resistant, rigid attachment for the plate. Below the plate, each of the support members 23 is offset forwardly so that the plate, when the backrest is mounted, is arranged above or slightly rearwardly of the upper and lower frame members 31 and 32 (FIG. 3). When the plate is upholstered, the offset 24 is concealed within the upholstery (FIG. 3). Below the offset 24, the lower portion 25 of each of the support members 23 extends downwardly to overlap the forward faces of both the upper and lower frame members 32 and 31. The lower portion 25 of each of the support members 23 has a central threaded opening for receiving a cap screw 26. The cap screw provides a mount for the clamping plates 27.

Each of the clamping plates 27 has a heavy reinforced central portion 28 and a pair of end recesses 29. The recesses are arranged at the ends of the clamping plate and each of them opens through both sides of the plate and through the adjacent end of the plate. The recesses 29 are so shaped that the plate 27 may seat parallel to its related support member 23 and, at the same time, securely seat one of the upper or lower frame members 32 or 31. The thickness of the reinforced central portion 28 of the plate with relation to the depth of the recesses 29 is such that when the support member 23 is engaged with the front face of the upper and lower frame members and the cap screw 26 has been tightened to firmly secure the clamping plate 27 against the rear faces of the same frame members, there is no contact between the central portion of the anchor plates and the support members. Further, the reinforced central portion 28 is sufficiently rigid that the tightening of the cap screw cannot deflect the plate, even though sufficient force is applied by the cap screw to provide a positive, non-slipping clamping action between the plate, the support members 23 and the upper and lower frame members 32 and 31. This is important to obtain a positive and dependable attachment of the backrest to the seat frame. It will be seen by this arrangement that the backrest can be readily attached to the existing frame work of the seat simply by seating the support members 23 against the forward face of the frame members 31 and 32, aligning the clamping plates and installing the cap screws 26. By reason of the fact that the frame members 31 and 32 are spaced, this particular attachment provides a positive anchor which will securely support the backrest against any rear and/or lateral twisting even under severe loading conditions. Yet at the same time the backrest has the benefit of the limited resiliency inherent in the tubular members 31 and 32.

Another feature of this invention is the fact that simply by opening the seam indicated at 40 in FIG. 1 so that the back of the seat frame is exposed, the backrest can be quickly installed without disturbing any other portion of the structure or the basic upholstery of the existing seat. Many of these seats are built with the cover made removable at this point. Thus, simply by opening the cover using the means already available, the seat frame is made accessible for attachment of the backrest of this invention. Where the upholstery is not made so readily removable, the seam may be opened and the stitching can be replaced with a zipper to reclose the seam and, at the same time, provide a proper closure for the upholstery where it has once been opened to install the backrest. It will be recognized that since access to the anchor plates 27 is readily available, the backrest can be removed quickly and simply.

This invention provides a simple, easily installed yet strong, positive and dependable backrest. It is particularly adapted to ready attachment and use with the type of tubular frame structure used in the heavy duty seats of larger motorcycles. Further it provides a backrest which is strong, resilient and dependable. It provides broad positive support for the rider, a very important improvement in backrests in high performance machines such as the ones for which this invention is intended. Its construction utilizes a minimal of parts and requires neither special tools nor special skills either to attach or to remove. The invention permits the backrest to be so shaped and so located that it is particularly useful to the passenger and provides the passenger with positive support, particularly since it cooperates with the upward curvature of the rear portion of the seat and is so located with respect to this upward curvature that the passenger is afforded support without the necessity of the passenger leaning further back and, thus, compromising the safety and comfort of the passenger. The invention eliminates the necessity for structural members which run along the seat beneath its primary structure where they would interfere with other equipment or could interfere with the proper functioning of the seat.

While a preferred embodiment of this invention has been illustrated and described, it will be recognized that some modifications may be made without departing from the principles of this invention and such modifications are to be considered as included within the hereinafter appended claims, unless the claims expressly state otherwise.

The embodiments of the invention in which an exclusive property or privilege is claimed are defined as follows:

1. A passenger backrest for a motorcycle seat, the seat having a tubular internal frame including a pair of vertically spaced, curved frame members, the rearward portion of the upper surface of said seat being upwardly curved; said backrest comprising: a curved primary plate and a pair of laterally spaced, generally vertically extending support members rigidly secured thereto, each of said support members being adapted to seat against the forward face of said curved frame members; an anchor plate, said anchor plate having a pair of recesses opening through the face thereof directed toward said support members, one of said recesses opening through one end of said plate and the other through the other end thereof; a detachable fastener securing each of said anchor plates intermediate its ends to one of said support members and when tightened pulling said anchor plate and support members together to clamp both of said curved frame members therebetween, one in each of said recesses; said anchor plates each being reinforced between the ends thereof to resist deflection when said fasteners are tightened; said support members being offset intermediate their ends to so position the backrest that it cooperates with and forms a continuity of the body support afforded by said upwardly curved rear portion of said seat.

2. The passenger backrest described in claim 1 wherein said offset of said support members is such that said primary plate is rearward of the lower portions of said support members.

3. A passenger backrest for a motorcycle seat adapted to be attached to a pair of vertically spaced, curved frame members of the seat; said backrest comprising: a curved primary plate of a length generally equal to the width of the seat; the ends of said plate being rounded and downwardly curved; and a pair of laterally spaced, generally vertically extending support members rigidly secured thereto, each of said support members being adapted to seat against the forward face of the curved frame members; means for detachably securing each of said support members to both of said frame members with said backrest vertically spaced from said seat; said support members having limited resiliency for absorption of rearwardly directed loads; a resilient pad covering at least the forward face and ends of said plate.

* * * * *